May 18, 1954 — H. J. MUNSON — 2,678,505
DOLL FOR PLAYING AT SURGERY
Filed July 6, 1951 — 2 Sheets-Sheet 1
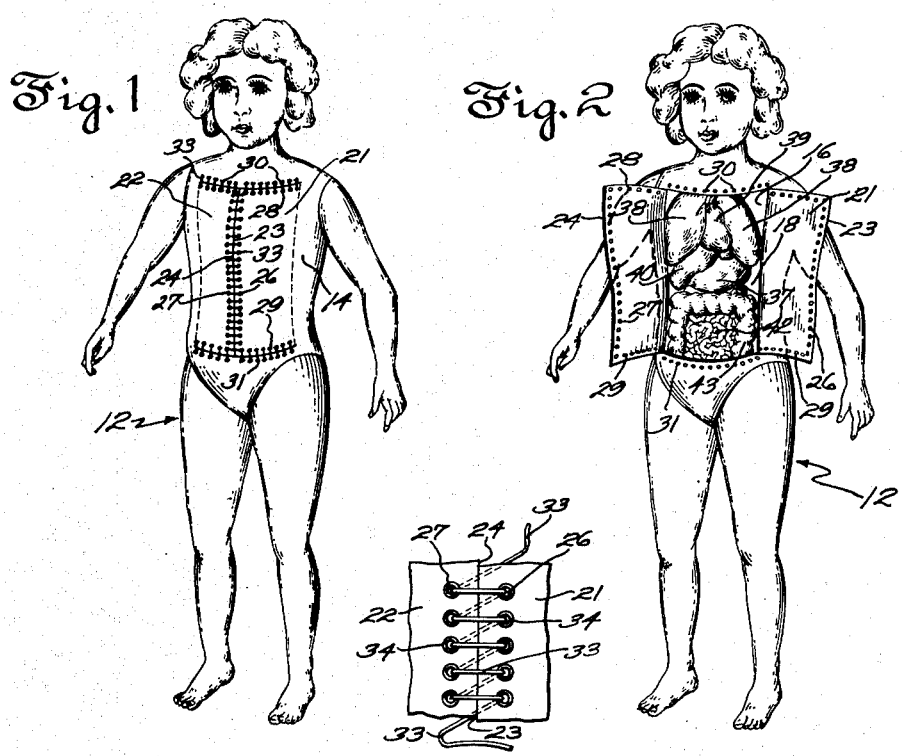
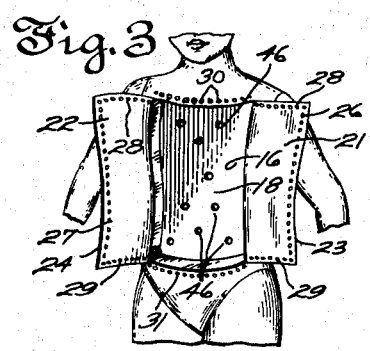
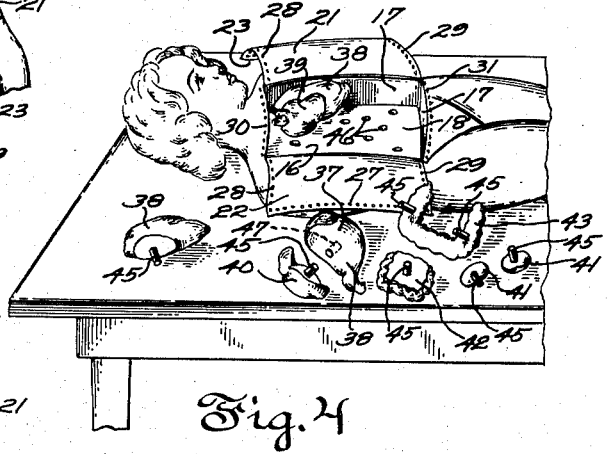
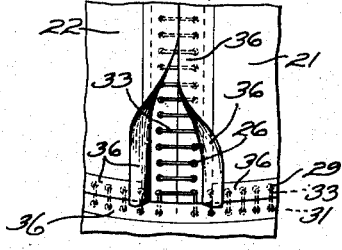
INVENTOR
Horace J. Munson,
BY
ATTORNEY May 18, 1954  H. J. MUNSON  2,678,505
DOLL FOR PLAYING AT SURGERY
Filed July 6, 1951 2 Sheets-Sheet 2
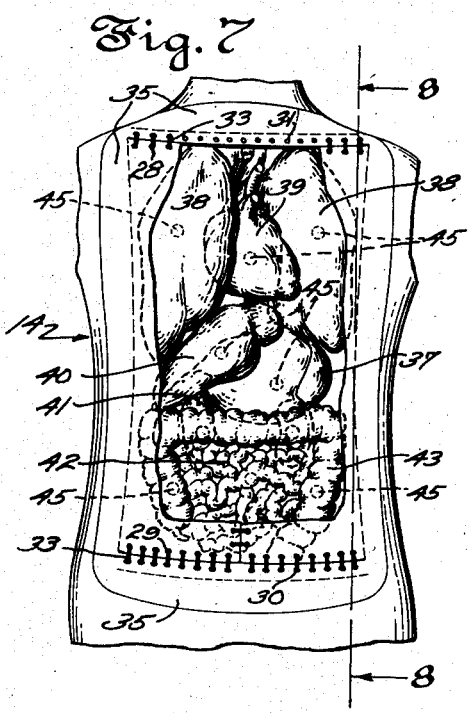
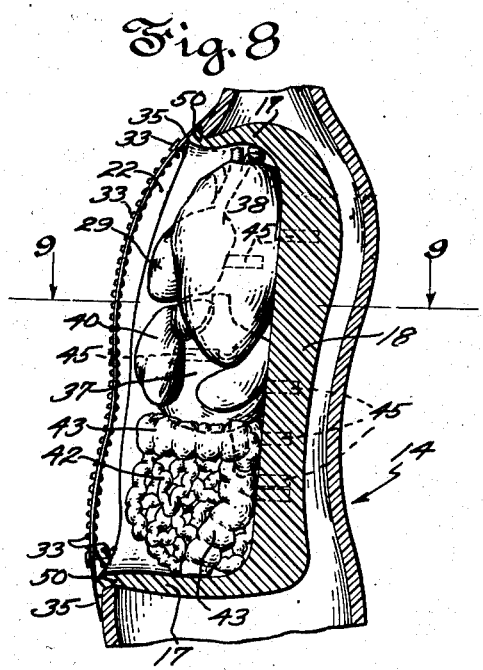
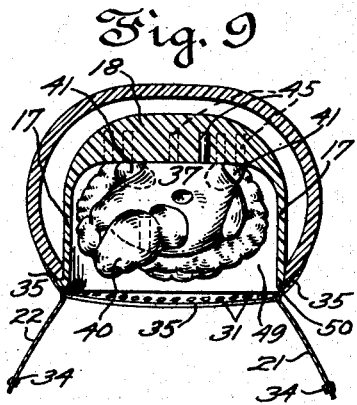
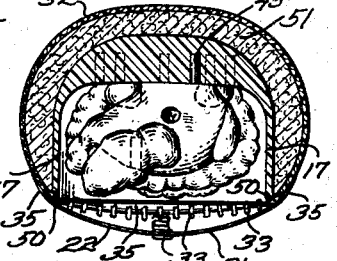
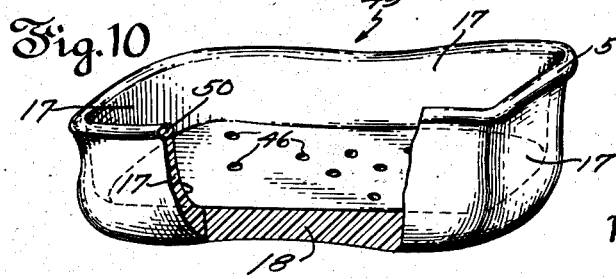
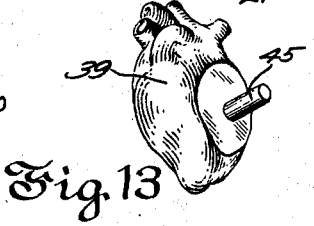
INVENTOR
Horace J. Munson,
BY
ATTORNEY Patented May 18, 1954

2,678,505

UNITED STATES PATENT OFFICE 2,678,505

DOLL FOR PLAYING AT SURGERY

Horace J. Munson, Fairfield, Conn.

Application July 6, 1951, Serial No. 235,471

2 Claims. (Cl. 35—17)

This invention relates to educational dolls structurally specialized so as to be usable by very young children in playing at surgery such as by removing make-believe organs from their natural place in a cavity in the doll's body and restoring the organs to place. Features of the invention pertain to simple ways and means for separating and reuniting edges of a skin-like body covering for gaining access to the organ containing cavity.

Problems are encountered in constructing play dolls so that they are practical for very young children to use in imitating surgical operations, due in part to their limited skill in attempts to manipulate small parts as well as to their faulty conception of orderly procedure.

It is an object of this invention to simplify and improve such structures and methods as have heretofore been proposed for using dolls to play at surgical operations and to such an extent that play of this kind becomes possible to children in the extremely young age brackets while providing time consuming interest as well as educational benefit to the child.

One object of the invention is to provide means for uniting and separating by finger manipulation alone the edges of a cavity covering, flexible sheet material representing the outside skin of a doll, and to avoid entirely the use of a knife or other sharp, pointed or dangerous tool for laying open a body cavity in playing at surgery. A related object is to cause the uniting and separating means to simulate suturing by making use of an unlaceable fastening of string or other flexible line imitative of sutures.

A further object is normally to conceal the imitative suturing or lacing by means of a liftable smooth external overlay unsuggestive of surgery.

A further object of the invention is to incorporate a hollow, cavity forming structure in the doll body containing make-believe natural human organs in miniature size adapted to be insertable within and removable at will from the cavity in the doll.

A further object is to fashion the cavity affording structure as a box-like insert which together with its contained organs can be incorporated interchangeably in the bodies of dolls of a variety of constructions during manufacture thereof.

A further object is to subdivide or partition the body interior of a doll by means of a box-like insert than can be placed in the torso of any of the above mentioned different structural types of dolls and held in fixed relation thereto by means of its rim edges, such dished or box-like insert carrying within its hollow, and in natural relative positions, various make-believe human organs anchored therein by easily partable connections that enable each organ to be removed separately from the cavity and then separately restored to its original position without requiring difficult or experienced manipulation.

The foregoing and related objectives of these improvements will become apparent from the following description of doll structures disclosing successful embodiments of the invention, which description refers to the appended drawings wherein:

Fig. 1 is a front view of a doll incorporating the present invention.

Fig. 2 is a view similar to Fig. 1 showing a cavity in the torso of the doll opened to expose make-believe internal organs in natural position therewithin.

Fig. 3 is a fragmentary view similar to Fig. 2 showing the cavity empty.

Fig. 4 shows the doll of Figs. 1 to 3 resting face-up on a table with certain of the make-believe internal organs removed and others still remaining within the cavity of the doll body.

Fig. 5 is an enlarged detail showing a style of lacing that may be employed to simulate suturing.

Fig. 6 shows a modification wherein the lacing of Figs. 1 and 5 is normally concealed by a liftable skin-like overlay.

Fig. 7 shows on an enlarged scale a modification of the structure in Figs. 1 to 6, inclusive, wherein the make-believe skin that covers the cavity comprises a separate panel of flexible sheet-like material with its margins overlapping and adhering permanently to the outer surface of the doll body.

Fig. 8 is a view taken partially in section on the plane 8—8 in Fig. 7, looking in the direction of the arrows, showing a box-like insert lodged in the torso of the doll.

Fig. 9 is a plan view taken partially in section on the plane 9—9 in Fig. 8.

Fig. 10 is an enlarged perspective view of the cavity affording box-like insert detached from the torso of the doll.

Fig. 11 shows the same box-like insert applied to a doll in a recess formed by hollowing out the material that continuously extends throughout the body of the doll.

Fig. 12 shows the same box-like insert applied within the torso of a doll whose body comprises a flexible outer skin stuffed with loose filling material.

Fig. 13 is an enlarged view of one of the removable organs simulating the heart.

The doll in Figs. 1–6, inclusive, may have its torso constructed as to detail in accordance with various conventional practices inclusive of the three types of body structure represented in Figs. 9, 11 or 12.

For convenience of reference the construction in Fig. 9 may be referred to as the empty hard-shelled type of doll body which usually comprises a slush casting of china or some other hard brittle substance whose external surface is molded from clay and then fired to simulate the appearance of human skin. Such construction does not require an all over facing of separate sheet-like material.

The doll body in Fig. 11 is typical of the solid molded forms that are often made of resilient compressible material such as soft rubber, sponge rubber or resilient cellular plastic. This type of doll body may or need not be surfaced by a separate skin-like allover covering. It can be hollowed out to afford an abdominal cavity 16 that will permanently maintain its shape without aid of a box-like insert such as 49, hereinafter described.

The doll body construction represented in Fig. 12 is more common in the cheaper makes of stuffed dolls wherein a flexible encompassing skin forms an envelope that is filled with loose padding material to round out its shape. Such material, without extraordinary treatment, is not suitable for defining a cavity of permanent shape in the absence of a stiff walled, dished insert of some kind such as 49.

Certain aspects of the invention which are applicable in common to all of the various body structures of dolls will first be described in relation to Figs. 1 to 6.

The doll as a whole is designated 12 having a torso 14. While the cavity 16 referred to in the following description is illustrated herein as confined to the torso of the doll, other openable cavities (not shown) might be provided at other locations in the body of the doll, such as a cavity opening through the neck to give access to a pseudo thyroid gland. Likewise any limb of the body could be provided with a cavity for giving access to particular pseudo blood vessels, nerves, bone joints, etc.

The cavity herein illustrated for disclosing a successful embodiment of the present improvements is designated 16. It is bordered by side walls 17 and a rear or mounting wall 18. While in a doll body of the construction shown in Fig. 11, walls 17 and 18 might consist only of the material 19 that is continuous throughout the doll body, such is not the case with the empty types of body construction shown in Figs. 9 and 12 which therefore require additional structure for partitioning the hollow interior of the torso with shape sustaining walls such as are afforded by the sides and back of a box-like insert 49.

In whatever form of structure cavity 16 may be incorporated, the opening to the cavity is to be covered by at least one flap of flexible skin-simulating sheet material permanently fastened to the body structure of the doll at any one of the sides of the cavity and having a free edge swingable to and from a position wherein the flap at least in part covers the cavity opening.

In the drawings two such skin-like flaps 21 and 22 are shown, each of whose respective free edges 23 and 24 are swingable to and from a mutually meeting position overlying the cavity as shown in Figs. 1 and 2. In keeping with a purpose of the invention entirely to avoid the use of any knife or other sharp or pointed tool in gaining access to the cavity, the free margins of flaps 21 and 22 are provided with rows of holes to receive lacings of string or other flexible line. The holes along the meeting edges 23, 24 of the flaps are designated 26 and 27. The holes in those free margins of the flaps which adjoin edges of the cavity when the flaps are closed are designated 28 and 29. A row of holes 30 parallel with the rows of holes 28 extends along the top edge of cavity 16 and a row of holes 31 parallel with the row of holes 29 extends along the bottom edge of cavity 16.

Flexible line 33 threads the holes 26 to 31, inclusive, in the manner indicated in the drawings and as shown in enlarged detail in Fig. 5. It thus forms likeness to sutures and serves to anchor the free flap edges in position to cause the flap or flaps to cover the aperture as in Fig. 1. To facilitate threading of line 33 through the holes and to reinforce the hole edges each hole may be bordered by an eyelet 34. The eyelets are made as inconspicuous as possible as by having a flat head and preferably being colored a flesh tone as is the surface of flaps 21 and 22, to match the color of the overall surface of the doll body.

Fig. 7 illustrates that when it is not feasible to cut the flaps 21 and 22 from the same skin that surfaces the entire torso of the doll, as in Fig. 12, these flaps may be formed by slitting a panel 35 of flexible sheet material or fine woven fabric whose margins overlie and are permanently secured to the exterior surface of the torso as by cement. Panel 35 should be applied in a way to make its presence as inconspicuous as possible and it is preferred that it be practically indistinguishable from the rest of the exterior surface of the doll. Top and bottom margins of panel 35 containing respectively the rows of holes 30 and 31 overhang the edges of cavity 16, or should be free to be lifted away from the body surface of the doll sufficiently to permit the threading of the line 33 through said holes for lacing thereto the holes 28 and 29 contained in the top and bottom margins of the flaps 21 and 22.

In Fig. 6 there is provided a strip overlay 36 which conceals the lacings of line 33. It consists of flexible preferably resilient sheet material having one of its longitudinal margins permanently attached as by cement to the external surface of the torso structure so that its opposite longitudinal margin will normally overlie and conceal the lacing, but can be lifted freely to give access to the line 33 for finger manipulation in the process of lacing and unlacing it.

Having described the simple and harmless means by which cavity 16 can be laid open and closed again, the manner in which the contents of the cavity can be taken out and replaced by very young children in playing at surgery is evident in Fig. 4. Various internal organs of the body are represented in miniature by small solid objects preferably molded from plastic in shape and color to represent them realistically, such as the stomach 37, lungs 38, heart 39, liver 40, kidneys 31, and the small and large intestines 42 and 43, respectively. It is important that two conditions be present in whatever means are employed to predetermine the relative location of the make-believe organs and to hold them in their proper positions in the cavity. One condition is that each organ shall be removable from the cavity 16 merely by clasping it and pulling it straight out directly away from the rear wall 18 of the cavity and through the cavity opening. The other is that each organ shall be lodgeable only in a predetermined natural position when it is put back in place.

While there are many connecting devices which could be employed that would meet these two conditions, those illustrated herein consist of pegs and sockets. While the sockets might be contained in the removable organ and the pegs might project from the walls of the cavity, I have chosen to show that each organ is provided with one or more projecting pegs 45 of shape and so spaced as to fit slidingly and snugly into sockets 46 contained in some wall of cavity 16, preferably the rear wall. The sockets are so directed that each peg can be made to enter or leave its socket by movement of the organ directly toward and away from the rear wall of the cavity. In Fig. 4 one of the organs is shown to contain a socket 47, in addition to the sockets 46 in the mounting wall 18, wherefore the peg 45 that is on the heart 39 may for example be inserted in this socket 47 that is in one of the lungs. This device of a peg carried by one organ entering a socket contained in another organ may be repeated in respect to as many of the organs as desired.

In Figs. 9 and 12 the cavity 16 is afforded by a box-like insert 49 that is held in fixed relation to the body structure of the doll by being inserted through an opening in the front of the torso that snugly fits the rim edges 50 of the insert which may be cemented or otherwise fastened to it. For this purpose the rim of the insert 49 is lipped outwardly so that it hooks over the outer edges of the torso opening as shown in Figs. 8 to 12.

The marginal portions of flexible panel 35 cover and conceal the joint between the insert rim 50 and the edge of the torso opening and thus conceal the presence of the insert 49. This insert as shown in Fig. 10 may be a molded part made of suitable plastic or rubber of sufficient stiffness to retain its shape and can be manufactured, together with the removable pieces 37 to 43, as a universal unit to be sold to various toy manufacturers for incorporating in the torsos of their otherwise differing and standard structures of dolls.

In playing with a doll embodying the present invention, the overlay strips 36 will first be lifted. Then starting with a free end of the suture string 33, the string will be unlaced from the various holes through which it is threaded which will permit the flaps 21 and 22 to be swung open as in Figs. 2, 3, 4 and 9. With the doll lying on a table as shown in Fig. 4, the objects 37 to 43 may be removed from the doll with some choice of sequence by merely lifting them one by one straight upward and out of the opening of the cavity, the pegs 45 easily pulling out of the sockets 46. In restoring the organ representing objects to place, the child will need to line up the proper pegs with the proper sockets or else the contents of the cavity will not satisfactorily assemble. From this fact the child can know whether the proper organ is being placed in its proper position and educational value will be derived. Further, the organ objects may be of distinctive colors to accord with differently colored regions of the cavity wall as a further guide to proper placement of the organs in the cavity. Following the correct restoration of the make-believe organs within the torso, the skin flaps 21 and 22 can be swung together and their edges 23 and 24 laced together by the string 33. In a similar manner the top and bottom edges of the flaps will be laced again to the margins of the flexible panel 35.

The features of the invention heretofore described will be found to afford time consuming interest for the child and will teach a basic conception of anatomy which teaching can be extended according to the principles of these improvements to include the taking out and replacing of various muscles, nerves, blood vessels, bone structures, etc. at various parts of a doll's body aside from the chest and abdominal cavities herewith cavitated to illustrate the invention.

The appended claims are directed to and intended to cover all substitutes and equivalents for the exact parts and arrangement herein disclosed which fairly come within the broadest interpretation of the language used in claims.

I claim:

1. In a doll constructed for playing at surgery, the combination of, a hollow doll body containing a chamber of constant size and shape having in the chest and abdominal region of the surface of the doll a permanent entrance opening of fixed shape and size approximately equal to said region, an open faced substantially rigid hollow receptacle of fixed shape and size sunk in said chamber and having a fixedly open face registering with said entrance opening, miniature simulacra representing internal human organs, means to locate said simulacra within said receptacle in natural arrangement and placed in respect to said entrance opening so as to be individually and selectively removable from their respective places in said receptacle and restorable thereto through said opening, skin-simulating thin flexible sheet material overlapping and anchored to the outer surface of said doll body and extending across said entrance opening and across the open face of said receptacle in a manner at times to cover and conceal said receptacle and the contents thereof and at times to fold relatively to said surface of the doll body, said sheet material comprising flaps having free margins that meet and span said entrance opening respectively containing rows of holes disposed therealong, and a pseudo suture removably threaded through said holes in a manner to hold said meeting margins releasably together.

2. In a doll constructed for playing at surgery, the combination defined in claim 1, in which at least one of the said flaps of skin simulating sheet material is approximately rectangular and terminates in three angularly related free margins that meet at the rectangular corners of the flap, the said rows of holes extending along all of said margins, together with structure fixed on the body of the doll presenting additional rows of holes respectively adjacent to two of said free flap margins and also removably threaded by pseudo suture to secure the said two margins releasably to the doll body.

References Cited in the file of this patent

UNITED STATES PATENTS

| Number | Name | Date |
|---|---|---|
| 2,034,446 | Saxe | Mar. 17, 1936 |
| 2,288,798 | Fleming | July 7, 1942 |
| 2,424,538 | Beder | July 29, 1947 |
| 2,501,520 | Howard | Mar. 21, 1950 |
| 2,551,433 | Graves | May 1, 1951 |

OTHER REFERENCES

Catalogue of the Chicago Apparatus Co., 1735 North Ashland Ave., Chicago, Illinois; pages 3 and 4; Dec. 18, 1939.